(12) United States Patent
Rowe

(10) Patent No.: US 10,088,374 B2
(45) Date of Patent: Oct. 2, 2018

(54) REVERSIBLE FORCE MEASURING DEVICE

(71) Applicant: Geoffrey K Rowe, Winter Springs, FL (US)

(72) Inventor: Geoffrey K Rowe, Winter Springs, FL (US)

(*) Notice: Subject to any disclaimer, the term of this patent is extended or adjusted under 35 U.S.C. 154(b) by 0 days.

(21) Appl. No.: 15/621,924

(22) Filed: Jun. 13, 2017

(65) Prior Publication Data

US 2017/0276555 A1    Sep. 28, 2017

Related U.S. Application Data

(63) Continuation-in-part of application No. 14/915,786, filed as application No. PCT/US2014/052781 on Aug. 26, 2014, which is a continuation of application No. 14/019,185, filed on Sep. 5, 2013, now Pat. No. 8,833,181.

(51) Int. Cl.
| | | |
|---|---|---|
| *G01L 1/04* | (2006.01) | |
| *G01L 1/02* | (2006.01) | |
| *G01L 5/24* | (2006.01) | |
| *G01G 5/04* | (2006.01) | |
| *G01G 5/00* | (2006.01) | |

(52) U.S. Cl.
CPC .................. *G01L 1/04* (2013.01); *G01G 5/04* (2013.01); *G01L 1/02* (2013.01); *G01L 5/243* (2013.01); *G01G 5/003* (2013.01)

(58) Field of Classification Search
CPC .. G01L 1/04; G01L 1/02; G01L 5/243; G01G 5/04; G01G 5/003

USPC ...................................................... 73/862.623
See application file for complete search history.

(56) References Cited

U.S. PATENT DOCUMENTS

| | | |
|---|---|---|
| 2,577,100 A | 12/1951 | Jose |
| 3,815,423 A | 6/1974 | Gearhart |
| 3,948,141 A | 4/1976 | Shinjo |
| 4,412,456 A | 11/1983 | Wilhelm et al. |
| 4,489,799 A | 12/1984 | Menon |
| 5,193,631 A | 3/1993 | Lannie et al. |

(Continued)

FOREIGN PATENT DOCUMENTS

| | | |
|---|---|---|
| DE | 4204066 A1 | 8/1993 |
| GB | 1374316 A | 11/1974 |
| SU | 1273753 A1 | 11/1986 |

*Primary Examiner* — Max Noori
(74) *Attorney, Agent, or Firm* — The Keys Law Firm PLLC

(57) ABSTRACT

A reversible force measuring device for ascertaining the magnitude and/or direction of an applied load and having a cavity containing an indicating material such as a fluid, with the cavity configured such that when a load is applied to the device, it causes a reversible volumetric change to the cavity. This change causes the indicating material to move in or out of the cavity in a quantity which corresponds to the magnitude and/or direction of the applied load. By measuring the movement of the indicating material, a user can determine the magnitude and/or direction of the applied load. The device may include a component which generates an electrical signal from the measured movement and transmits this signal to another device to control the tensioning of one or more fastener components and or make other analytical measurements by combining this measurement with other measurements like torque and or angle.

12 Claims, 21 Drawing Sheets

(56) References Cited

U.S. PATENT DOCUMENTS

| | | | | |
|---|---|---|---|---|
| 5,412,582 | A | * | 5/1995 | Hesthamar ............ F16B 31/028 |
| | | | | 702/43 |
| 6,501,211 | B1 | * | 12/2002 | Nasrollahzadeh ...... G01L 5/246 |
| | | | | 310/317 |
| 7,171,851 | B2 | | 2/2007 | Kamata |
| 8,833,181 | B1 | * | 9/2014 | Rowe ........................ G01L 1/04 |
| | | | | 73/862.581 |
| 8,993,084 | B2 | * | 3/2015 | Griess ....................... B32B 5/26 |
| | | | | 428/60 |
| 2003/0094314 | A1 | | 5/2003 | Chang |
| 2003/0157709 | A1 | | 8/2003 | DiMilla et al. |
| 2003/0173958 | A1 | * | 9/2003 | Goldfine ............... G01L 5/0047 |
| | | | | 324/209 |
| 2004/0016304 | A1 | * | 1/2004 | Kaijala .................. B60R 22/18 |
| | | | | 73/862.69 |
| 2005/0184185 | A1 | * | 8/2005 | Holbein .................. B60R 22/46 |
| | | | | 242/374 |
| 2008/0106873 | A1 | | 5/2008 | Okuya |
| 2016/0045081 | A1 | * | 2/2016 | Kern ...................... A47K 7/043 |
| | | | | 15/22.4 |

\* cited by examiner

REVERSIBLE FORCE MEASURING DEVICE

CROSS REFERENCE TO RELATED APPLICATIONS

This application is a continuation in part of, claims the benefit of, and incorporates by reference co-pending U.S. patent application Ser. No. 14/915,786 filed Mar. 1, 2016, which is a National Stage filing of PCT/US14/52781 filed on Aug. 26, 2014, which is a continuation of U.S. patent application Ser. No. 14/019,185 filed Sep. 5, 2013 (now U.S. Pat. No. 8,833,181).

BACKGROUND OF THE INVENTION

Field of the Invention

This invention relates to measuring devices which are integrated into fastener components or load cells components and provide a real time, continuous output of the force being applied on such a component.

Description of the Prior Art

The use of various styles of scales to measure weight (i.e. force) or calculate mass is well known. A problem which still exists, however, is that attempts to measure the force placed on a fastener or load cell (or "loadcell"), particularly when tension or compression is being placed thereon, have been unsuccessful because the dimensions are so small on such devices that any changes—about 0.01 inches—have been too difficult to measure. There remains a need, however, for the integration of force measuring features into fastener components or load cell components so as to enable fasteners or load cells to be able to provide a real time, continuous visual output of the magnitude and/or direction of the force being applied thereto. It would be desirable if such fastener components or load cell components having force measuring features included an output mechanism which enabled measured forces to be displayed on remote devices or even to control the operation of a discrete device which was applying force on the fastener components or load cell components.

The Applicant's invention described herein provides for a reversible force measuring device for fastener components and load cells components that measures static and dynamic forces such as tension, compression, torque, and shear through the reversible volumetric changes of the cavities in the measuring device. The primary components in Applicant's reversible force measuring device are a cavity, a cavity wall, a load receiving area, and indicating material moving in a reversible manner in and out of the cavity into an indicating channel. When in operation, the reversible force measuring device enables more accurate and inexpensive method of controlling the tension or compression being placed on a fastener or load cell. As a result, many of the limitations imposed by prior art structures are removed.

SUMMARY OF THE INVENTION

The present disclosure describes a reversible force measuring device which allows a user to ascertain the magnitude and/or direction of an applied load. In one embodiment, the reversible force measuring device includes a cavity containing an indicating material, such as a fluid, with the cavity configured such that when a load is applied to the device, it causes a reversible volumetric change to the cavity. This volumetric change causes the indicating material to move in or out of the cavity in a quantity which corresponds to the magnitude and/or direction of the applied load. Thus, by measuring the movement of the indicating material, a user can determine the magnitude and/or direction of the applied load. The reversible force measuring device may also include a component which converts the measured movement into an electrical signal and transmits this electrical signal to a remote device.

As used herein, a reversible volumetric change refers to a property of the cavity which enables it to reverse a volumetric change that resulted from the application of a load when the forces are reversed. In other words, when the load is removed the cavity returns to its original shape. Advantageously, because the volumetric change corresponds to the magnitude and/or direction of the applied load, the force measuring device can continuously measure the changes in the forces by tracking the movement and relative position of the indicating material. As such, if a load on a reversible force measuring device built in accordance with the present invention increases or decreases ten (10) percent, the movement of the indicating material in the force measuring device will indicate this ten (10) percent change.

DETAILED DESCRIPTION OF THE INVENTION

Figure 1:
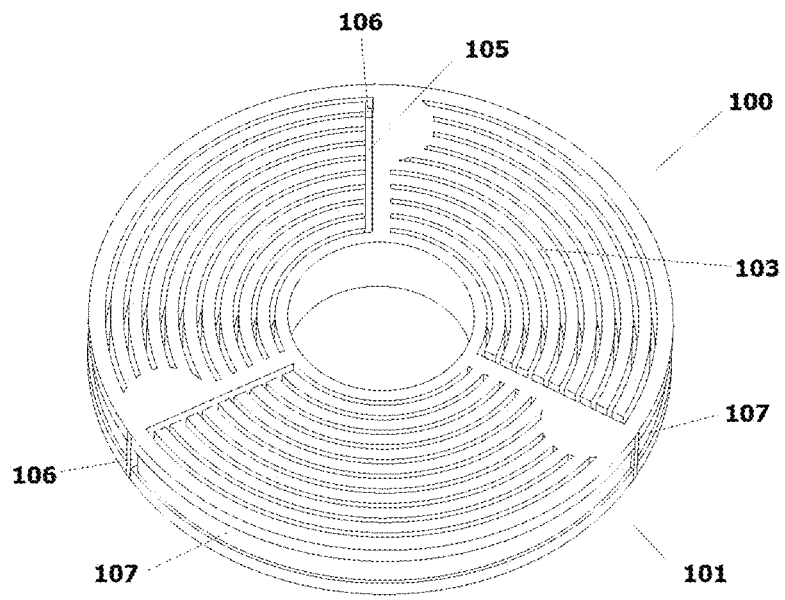
FIG. 1 is a perspective view of a circular shape embodiment of a force measuring device built in accordance with the present invention.

A reversible force measuring device that, when load is applied thereto, provides an indication of the magnitude and/or direction of the applied load is described herein. In one embodiment, the reversible force measuring device includes an integral three dimensional cavity whose shape is altered when load is applied to the device so as to cause a reversible volumetric change to the cavity. This reversible volumetric change causes an indicating material to move in or out of the cavity and the movement of the indicating material operates to indicate the magnitude and/or direction of the applied loads.

As used herein, reversible volumetric change refers to the ability of the cavity to reverse whatever change in volume that was caused by the shape of the cavity being altered when the forces from the applied load are removed. As such, the cavity in the reversible force measuring device returns to its original shape once the load is no longer being applied to the reversible force measuring device. As a result, the force measuring device is able to continuously measure the forces being applied thereto from a load. Accordingly, if the load progressively increases or decreases ten (10) percent, the device can progressively reflect this ten (10) percent change.

In one embodiment, the reversible force measuring device can define a fastener component or a load cell component that includes a load receiving area, a cavity defined by a space adjacent to a cavity wall, and indicating material integral with the cavity. In such an embodiment, the application of force to the load receiving area induces the Poisson effect on the one cavity wall, with the Poisson effect causing the reversible volumetric change of the cavity. This reversible volumetric change of the cavity causes the indicating material to move in or out of the cavity in an amount that corresponds to the magnitude and/or direction of the applied load. Thus, the movement of the indicating material provides an indication of the magnitude and/or direction of the applied load.

It is contemplated that the reversible force measuring device may include a single cavity or a plurality of cavities, a single cavity wall or a plurality of cavity walls, and a single portion of indicating material or a plurality of portions of indicating material.

In one embodiment, the reversible force measuring device can also include an indicator duct, an indicator hole, an indicator channel, and a channel cover or tube integral with one cavity or a plurality of cavities in the reversible force measuring device. In such an embodiment, the indicator duct is connected with the cavity and the indicating channel cover or tube, which may be constructed of transparent or semi-transparent material, covers and/or seals the indicator channel. In operation, the indicating material moves from the cavity into the indicator duct, through the indicator hole, and into the indicator channel or tube when force is applied to the load receiving area.

In another embodiment, the reversible force measuring device can define a fastener component or a load cell component that includes a cavity defined by a space between a flexible cavity wall and a fixed cavity wall, and indicating material. It is contemplated that the fixed cavity wall may be part of or adjacent to a fixed medium. In such an embodiment, the application of force to fastener component or a load cell component causes a reversible volumetric change of the cavity by moving the flexible cavity wall, and this reversible volumetric change causes the indicating material to move in or out of the cavity in an amount that corresponds to the magnitude and/or direction of the applied load. Thus, the movement of the indicating material provides an indication of the magnitude and/or direction of the applied load.

It is contemplated that the force may be applied by a fastener component such as a bolt, threaded rod, threaded nut, turnbuckle, etc.

In such an embodiment, the reversible force measuring device can additionally include an indicator hole and an indicator tube integral with each cavity and structured so that when the indicating material moves in and out from the cavity, it moves into the indicator tube through the indicator hole.

It is also contemplated that the reversible force measuring device may include a single cavity or a plurality of cavities, a single flexible cavity wall or a plurality of flexible cavity walls, a single fixed cavity wall or a plurality of fixed cavity walls, and a single portion of indicating material or a plurality of portions of indicating material.

In another embodiment, the reversible force measuring device defines a fastener component or a load cell component that includes a load receiving area, a plurality of independent cavities, and indicating material. In such an embodiment, the application load to the load receiving area induces reversible volumetric changes in each of the independent cavities or, in the event of a localized load, in a set of the cavities appurtenant to the location or direction of the load.

In such an embodiment, each of the cavities can include an indicator hole, an indicator channel, and a channel cover or tube that is constructed of transparent or semi-transparent material, and covers and seals the at least one indicator channel. The indicator hole and indicator channel are attached to the respective cavity such that when indicating material moves in or out from the cavity, it moves through the indicator hole and into the indicator channel.

Referring now to the drawings and, in particular, FIGS. 1-6, a circular shape embodiment of a force measuring device 100 is shown having a cavity 103, and a load receiving area 101 (backside). It is contemplated that indicating material, such as a fluid would be disposed in the cavity 103 (or multiple cavities). As discussed above, the load receiving area 101 is integrated with the cavity 103 such that the application of an external force to the load receiving area 101 causes a change in the volume of the cavity 103, thereby forcing indicating material to be forced in or out of the cavity 103 in a quantity which indicates the magnitude and/or direction of the applied external loads.

It is appreciated that the load receiving area 101 can be on either surface (top or bottom) or both surfaces of the force measuring device 100. Furthermore, the applied force can be simultaneously applied to both top and bottom surfaces.

Figure 2:
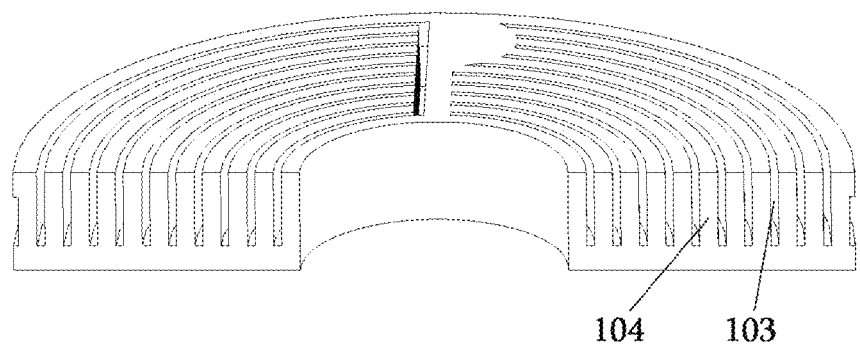
FIG. 2 is a sectional view of the circular shape embodiment of a force measuring device built in accordance with the present invention.

As shown in FIG. 2, the cavities 103 are disposed between cavity walls 104. In this embodiment, the cavity walls 104 are Compression-Poisson columns arranged as concentric columns. The cavity walls 104 are closely spaced to minimize the volumes of the cavities 103 and to therefore maximize the sensitivity of the force measuring device 100. As more cavities 103 and cavity walls are fitted into the circular shape force measuring device 100, the ratio between the height and width of each cavity wall gets greater which increases the sensitivity of the device 100 by allowing more Poisson motion (avoids more of the constrained Poisson) which increases the change in cavity volume for the same load.

Figure 3:
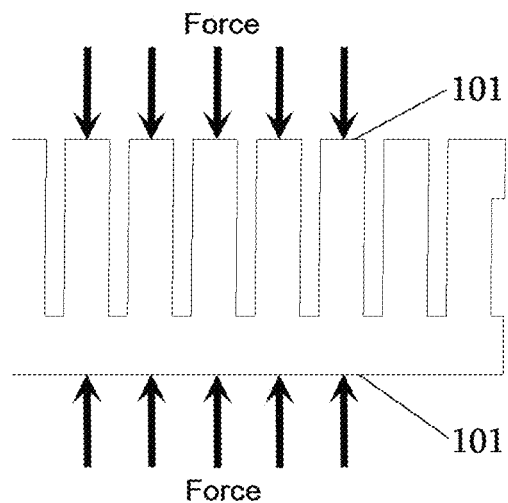
FIG. 3 is an illustration of how compression load is applied to the circular shape embodiment of a force measuring device built in accordance with the present invention.
Figure 4:
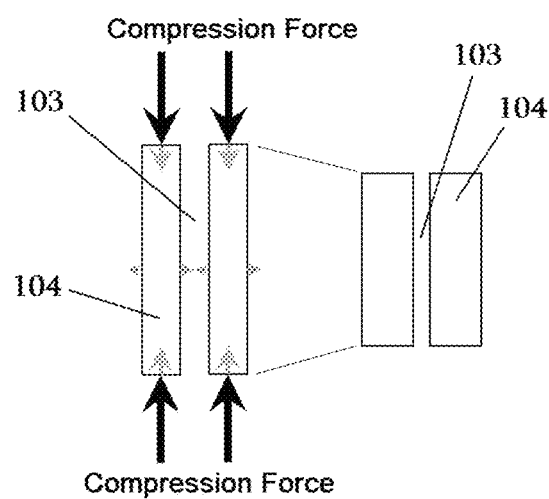
FIG. 4 is an illustration of how a compression load causes a cavity to change volume in the circular shape embodiment of a force measuring device built in accordance with the present invention.

FIGS. 3 and 4 illustrate how an external compression load could be applied to load receiving areas 101 on the force measuring device 100. For example, a compression load can be applied from both the top and bottom of the force measuring device 100.

As an external compression load is received by the load receiving area 101, the force on the load receiving area 101 is transferred to the cavity walls 104, directly causing a change in the width of the cavity wall 104. The cavity wall 104 is made of at least one Compression-Poisson column that changes shape according to the Poisson effect induced by the applied compression load. The directions of the forces applied are shown by the largest arrows on the top and bottom. The smaller arrows indicate the changes in the Compression-Poisson columns heights and widths. As shown, the cavity wall 104 becomes shorter in height due to compression load and wider due to the Poisson strain. As a result, the cavity 103 decreases in volume as the spaces between the cavity wall 104 are taken by the expansion of the cavity wall 104 in the lateral direction. Consequently, a corresponding amount of the indicating material is squeezed out from the cavity 103. A different compression load will result in a different Poison effect induced in the cavity wall 104 hence a different volume change in the cavity 103. Therefore, the amount of indicating material being squeezed out from the cavity 103 is an indication of the amount of compression load being applied to the load receiving area 101. By measuring the amount of the indicating material being squeezed out from the at least one cavity 103, the force applied to the device 100 can thus be calculated.

Figure 5:
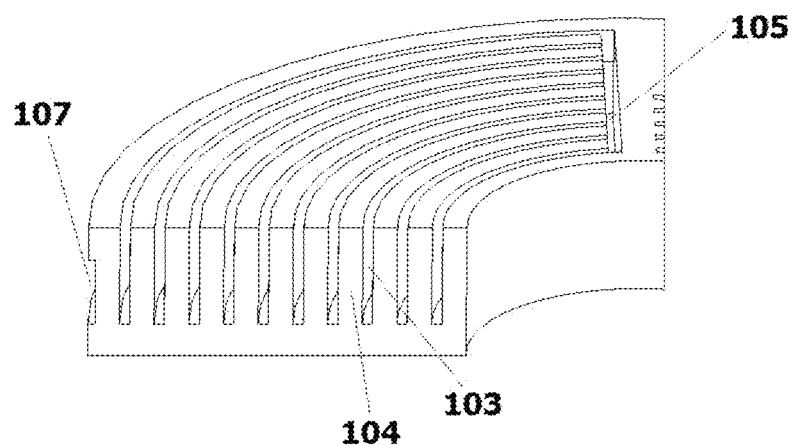
FIG. 5 is a perspective view of the interior of the circular shape embodiment of a force measuring device built in accordance with the present invention.
Figure 6:
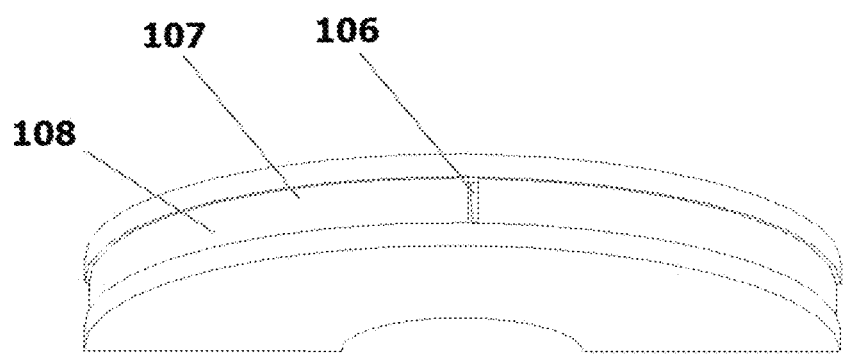
FIG. 6 is a perspective view of the indicator channel of the circular shape embodiment of a force measuring device built in accordance with the present invention shown with the cover removed.

As illustrated in FIG. 5 and FIG. 6, the force measuring device 100 may include a mechanism by which the indicating material squeezed out from the cavity 103 can be conveniently observed or sensed. In this embodiment, the force measuring device 100 can further comprise an indicator duct 105, an indicator hole 106, an indicator channel 107, and an channel cover (not shown). The location 108 of the channel cover is shown but not the cover itself. In an embodiment which has multiple cavities 103, the indicator duct 105 is needed to connect the cavities 103 together. The indicator duct 105 serves as a common channel for the indicating material to travel from many cavities 103 in the device 100 to the outside of the device 100. The indicator duct 105 will also serve as a common channel for the indicating material to travel back into the cavities 103.

The indicator hole 106 is needed for the indicating material to exit the interior of the force measuring device 100. In this embodiment, an indicator hole 106 is disposed on the exterior surface of the device 100. One end of the indicator duct 105 is connected to the indicator hole 106. In this embodiment, the indicator hole 106 is connected to an indicator channel 107 on the exterior surface, with channel cover (the location 108 for the cover is shown, but not the cover itself) that is made of transparent or semi-transparent material, covers and seals the indicator channel 107. The transparent or semi-transparent cover allows an observer to observe (or a sensor to sense) the amount of indicator material being squeezed out from the device 100 due to compression load.

Figure 7:
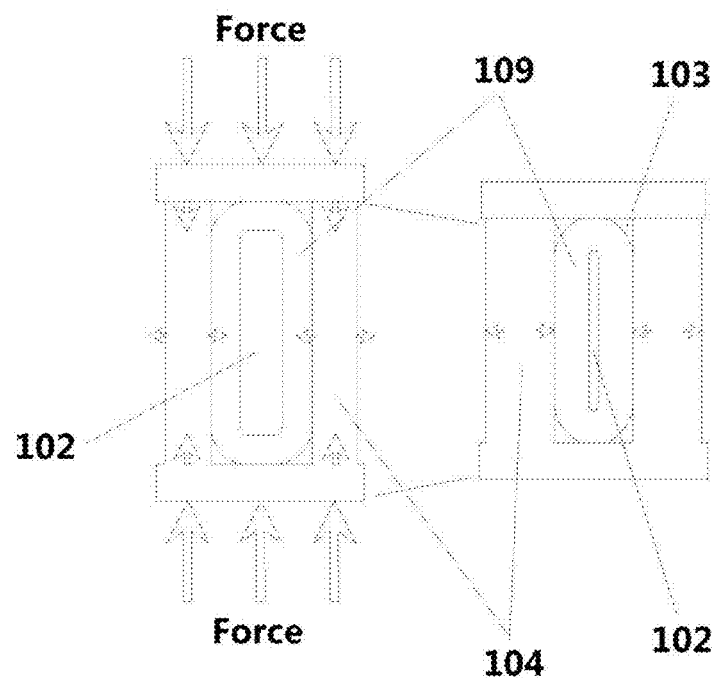
FIG. 7 is an elevational view of a force measuring device built in accordance with an embodiment of the present invention with its cavity having a tube filled with a resilient material, such as a fluid.

Referring now to FIG. 7, it is contemplated that the cavity 103 of a force measuring device may include a tube 109. In this embodiment, the cavity 103 is sized to receive a tube 109 made of resilient materials to be inserted into the cavity 103. The tube 109 will seal the indicating material. As the cavity 103 decreases or increases in volume, tube 109 will be squeezed more or less causing the inside volume of the tube 109 to shrink or expand with the cavity 103 thus the indicating material inside the tube 109 will move in or out of the tube 109.

Figure 8:
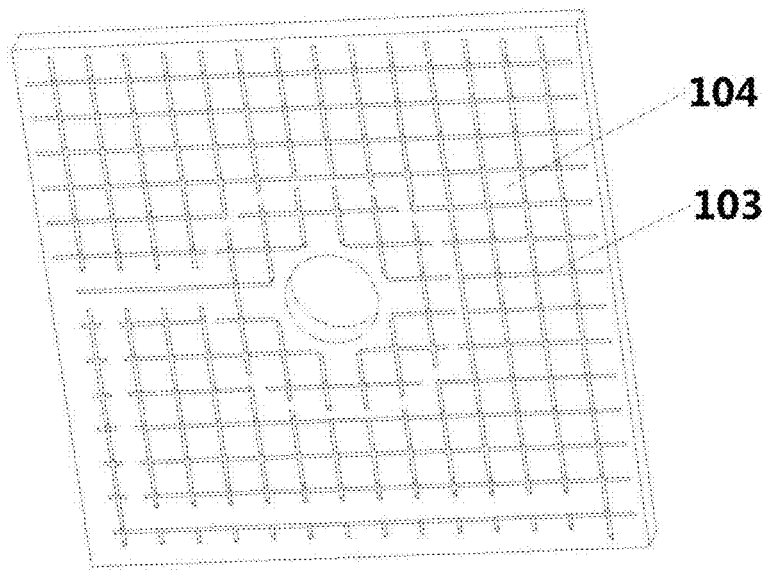
FIG. 8 is a perspective view of a force measuring device built in accordance with a rectangular embodiment of the present invention.
Figure 9:
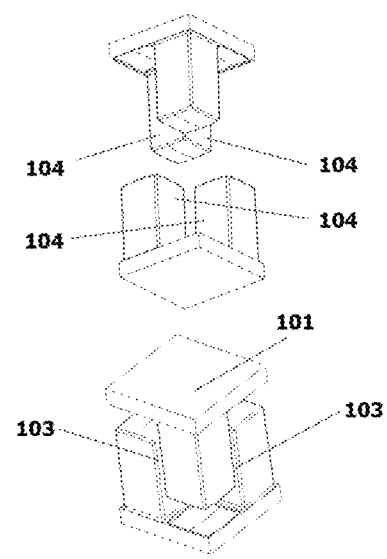
FIG. 9 is a perspective view of a force measuring device built in accordance with an embodiment of the present invention showing a section that is made up of two sections each with two Compression-Poisson columns.

Referring now to FIG. 8 and FIG. 9, a rectangular embodiment of the force measuring device is shown. In such an embodiment, the cavity 103 is constructed by square columns 104. FIG. 8 illustrates an embodiment where the columns 104 are square and have the at least one cavity 103 in between these square columns. FIG. 9 illustrates a portion of an embodiment where the Compression-Poisson columns are interleaved between the two parts and form all the Compression-Poisson columns as the parts are assembled together. FIG. 9 shows a construction with an upper and lower section that fit into one another. Each section shown has two Compression-Poisson columns 104, often referred to as cavity walls, extending from a load receiving area 101 such that when the top and bottom sections are assembled together the result is four Compression-Poisson columns 104 where the at least one cavity 103 is formed by the spaces between these columns.

FIG. 8 and FIG. 9 embodiments have the advantage of lowering the constrained Poisson surfaces in two dimensions. In the embodiment shown in FIGS. 1-6, the Poison change of the cavity wall 104 is only in one dimension. In FIG. 8 and FIG. 9 embodiments, the Poison change of the cavity walls 104 can occur in both x and y directions. This will allow an increase in the change in the volume of the cavities 103 for the same applied force therefore making the force measurement device 100 more sensitive.

Figure 10:
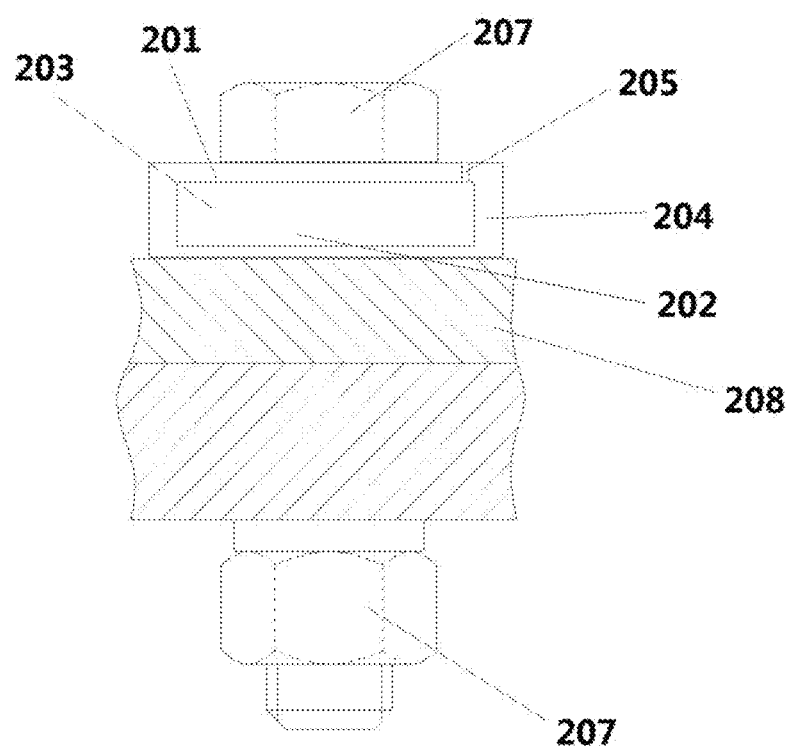
FIG. 10 is an elevational view of a force measuring device built in accordance with an embodiment of the present invention in which the load receiving area is flat and a load is applied to a cavity through a bolt head.
Figure 11:
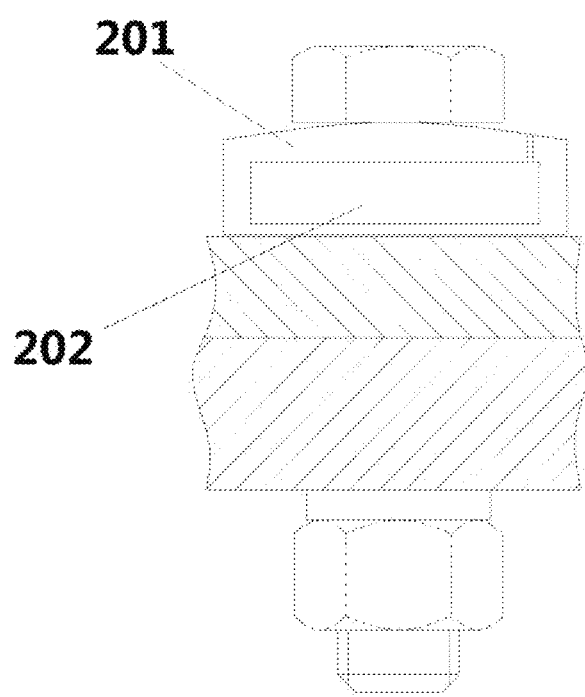
FIG. 11 is an elevational view of a force measuring device built in accordance with an embodiment of the present invention in which the load receiving area is elevated and a load is applied to a cavity through a bolt head.

Referring now to FIG. 10 and FIG. 11, two similar embodiments of a force measurement device are shown having a cavity 203, a load receiving area 201, and indicating material 202 disposed in the cavity. The load receiving 201 area can be deformed by the movement of a fastener 207. The fastener 207 shown in these figures is a bolt head, but it is appreciated that it could be a nut, stud, rivet, or other similar structures. The deformation of the load receiving area 201 directly causes a change in the volume of the cavity 203. The change in volume of the cavity 203 causes the indicating material 202 to move in and out of the cavity 203 to indicate the magnitude and/or direction of the applied loads. FIG. 11's load receiving area 201 is shaped differently than FIG. 10's at least one load receiving area 201 to increase the sensitivity.

In FIG. 10 and FIG. 11 embodiments, the force measurement device is more sensitive than embodiments shown in FIGS. 1-9 and can be used for measuring much lower loads. In these embodiments, the force measurement device does not use compression strain or Poisson strain as the main deformation for changing the volume of a cavity 203. The bending of the load receiving area 201 directly causes the upper exterior surface of the cavity 203 (this upper exterior surface of the cavity 203 forms the cavity wall) to deform and lower the volume in the cavity 203, thereby squeezing the indicating material 202 out of an indicator hole 205 from the cavity 203. It is understood that the side wall 204 may slightly compress and/or bend in response to the load on the load receiving area 201, but in this embodiment, this effect would not be used to materially change the cavity 203 volume.

Similar to embodiments described above, the force measuring device in this embodiment can include an indicator hole 205 and an indicator tube (shown in FIG. 14) cooperatively arranged such that the indicating material 202 moves in and out from the cavity 203 into the indicator tube through the indicator hole 205 when the at least one cavity 203 changes in volume.

Figure 12:
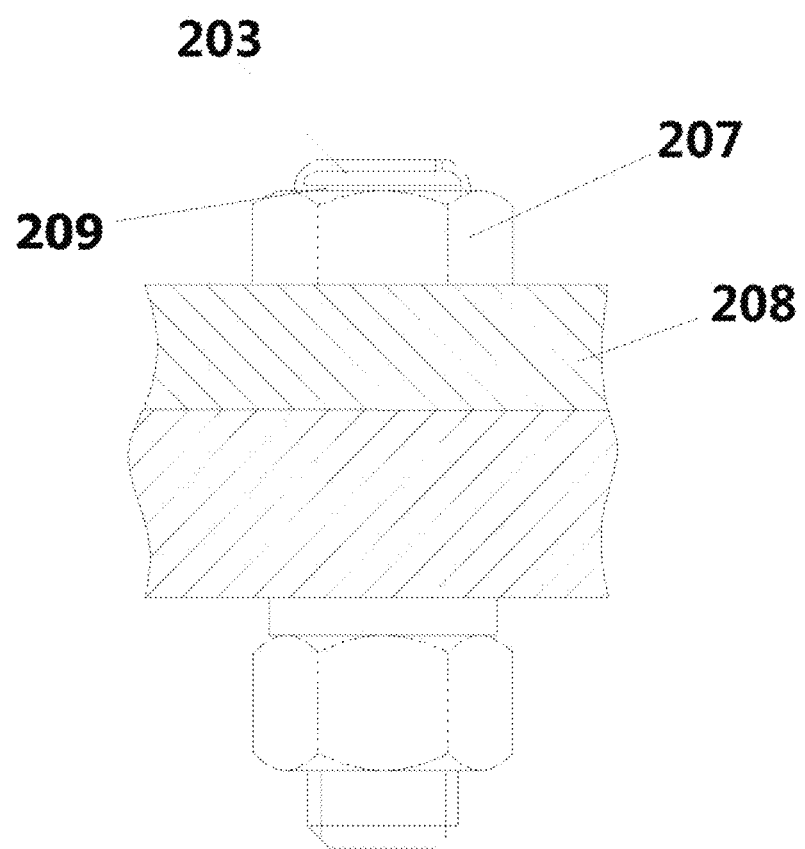
FIG. 12 is an elevational view of a force measuring device built in accordance with an embodiment of the present invention in which a cavity is placed above a bolt head.
Figure 14:
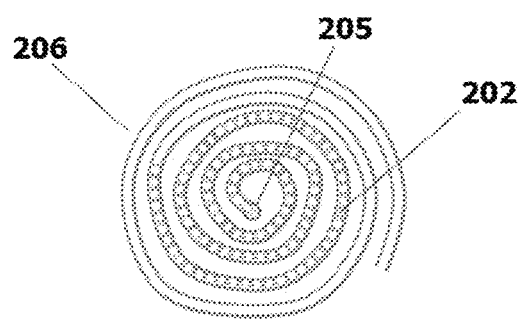
FIG. 14 is a plan view of an indicating tube of a force measuring device built in accordance with the present invention.

Referring now to FIG. 12, an embodiment of the force measuring device in which the cavity 203 is on top of the fastener 207 which clamps materials 208 together is shown. When the fastener 207 is tightened, the center section of the top of the head of the bolt 207 moves down which moves the flexible cavity wall 209 of the cavity 203 downward with the bolt head. This downward movement increases the volume of the cavity 203 which draws indicating material from an external indicating tube (not shown here but is shown in FIG. 14). The upper section of the cavity 203 is fixed and does not move as the fastener 207 is tensioned. The flexible cavity wall 209 of the cavity 203 can also be the top of the bolt head instead of a separate layer 209 as shown in FIG. 12.

Figure 13:
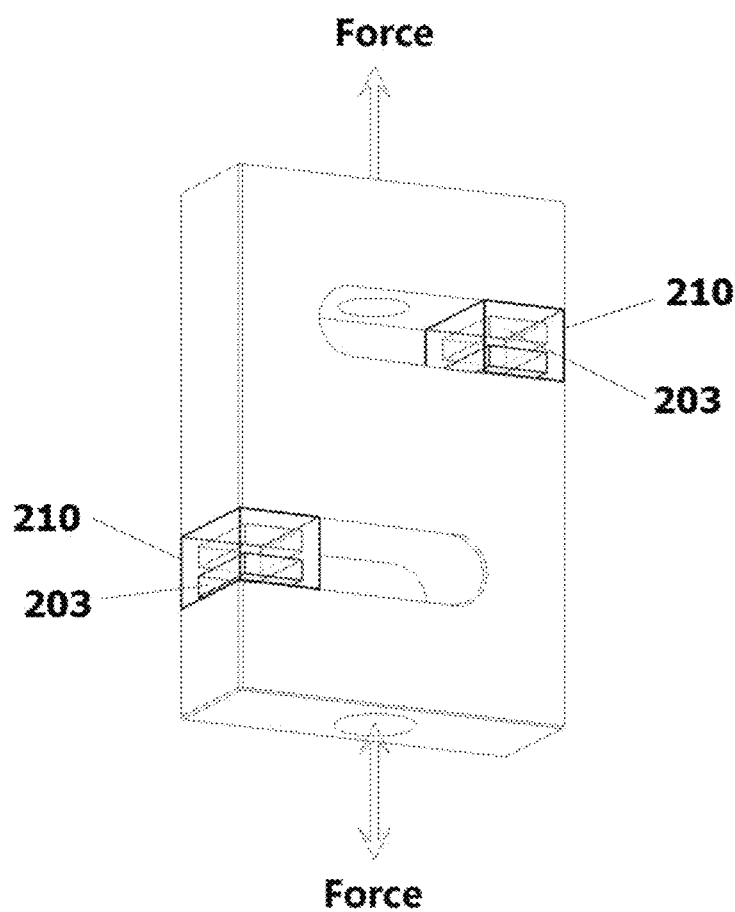
FIG. 13 is a perspective view of a force measuring device built in accordance with a load cell embodiment of the present invention in which a cavity is in a load cell.

Referring now to FIG. 13, an embodiment of the force measuring device in which the cavity 203 is positioned in the cavity holder 210 attached to a load cell type fastener is shown. In this embodiment, the deformation of the cavity 203 can be caused by the movement of another fastener component (not shown), with the load receiving area being the threads of the load cell. When the fastener puts the load cell in compression or tension the volume in the cavity 203 changes which moves the indicating material in or out of an indicating tube. The change in volume of the cavity 203 can be used to measure the direction and magnitude of the applied force.

Referring now to FIG. 14, an embodiment of an indicator tube 206 is shown. As discussed above, the indicator tube 206 may be used to indicate a volumetric change of the cavity if the indicating material 202 is connected to the cavity (through the at least one indicator hole 205 or otherwise) such that changes in the cavity force indicating material 202 in or out of the indicator tube 206.

Figure 15:
FIG. 15 is an elevational view of a cross section of a force measuring device built in accordance with a two independent cavity embodiment of the present invention in which shear forces can be measured.
Figure 16:
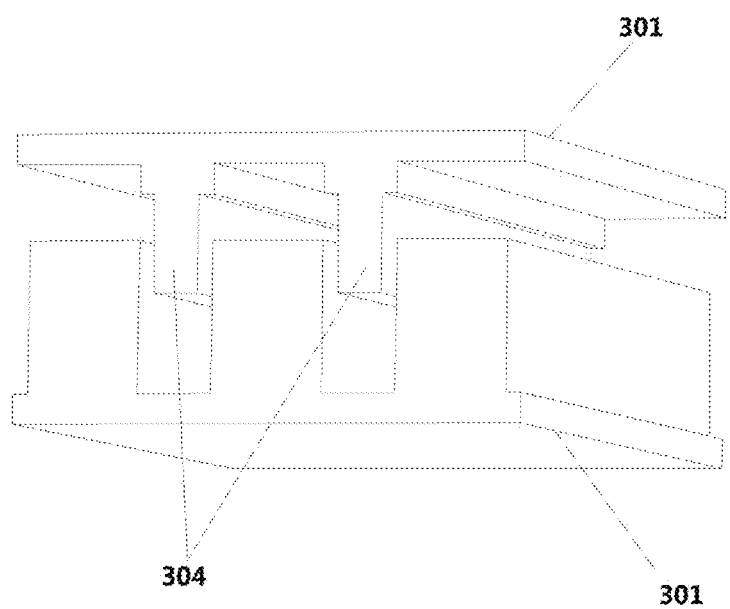
FIG. 16 is an exploded perspective view of a force measuring device built in accordance with a two independent cavity embodiment of the present invention.

Referring now to FIG. 15 and FIG. 16, an embodiment of the force measuring device is shown having two independent cavities 303, 305, a load receiving area 301, and indicating material. In this embodiment, the volume of the two independent cavities 303, 305 change when force is applied to the load receiving area 301. The indicating material moves in or out of the independent cavities 303, 305 as their volumes change to indicate the magnitude and/or direction of the applied loads. If the top part 304 moves to the left, a seal 306 keeps the indicating materials in 303, 305 separated without bending either of the bottom columns. This allows the change in cavity 303 volume to be different from the change in cavity 305 volume.

This embodiment provides added capabilities as it is designed to measure force applied to the device by observing the difference between the amount of indicating materials being squeezed out from the at least two independent cavities 303, 305. In the embodiment shown in FIG. 15, shear forces are applied to the device 100. In order to measure shear forces in this embodiment, the at least one indicating material in the left cavity 303 is isolated from the right cavity 305. There can be one indicator tube for the left cavity and one indicator tube for the right cavity. When the at least two cavities are subjected to shear force, the change of volume in the left cavity 303 and right cavity 305 will be different, therefore there will be different volumes of indicator material moved in each indicator tube. Shear forces and compression forces can be therefore measured by observing the amount of indicating material in each of the indicator tubes.

Figure 17:
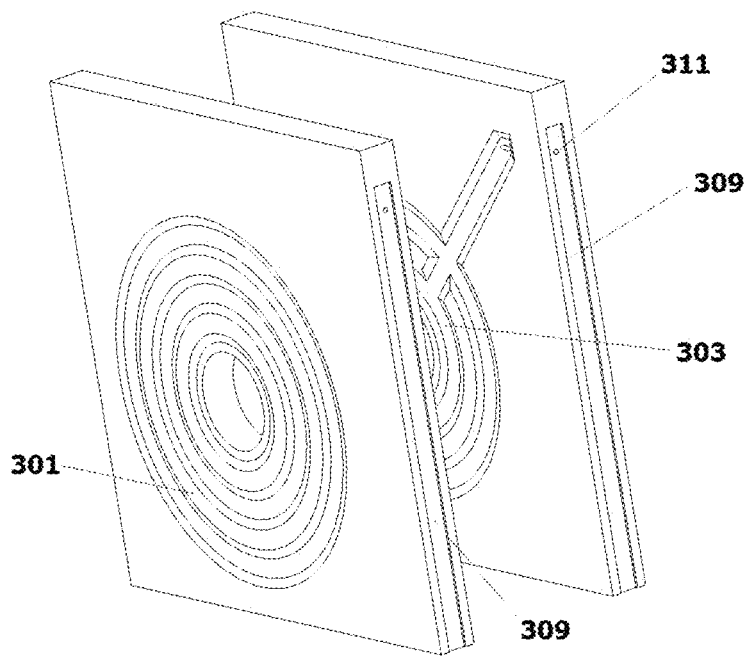
FIG. 17 is an exploded perspective view of a force measuring device built in accordance with an embodiment of the present invention in which a cavity is in a ring shape.
Figure 18:
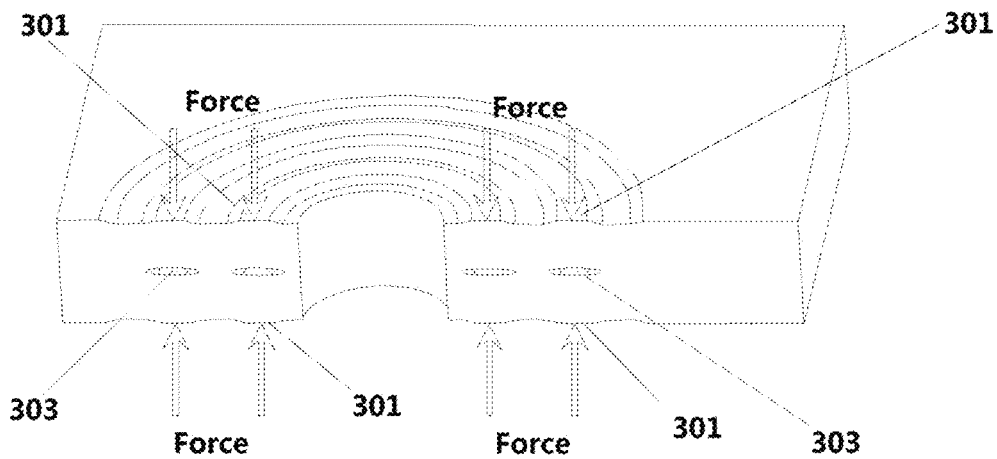
FIG. 18 is a perspective view showing a cross section of a force measuring device built in accordance with an embodiment of the present invention in which a cavity is in a ring shape.

Referring now to FIG. 17 and FIG. 18, an embodiment of the force measuring device is shown with a cavity 303 in a ring shape. In this embodiment, the design relies on tangential strain, bending, and/or compression of diagonal sections to squeeze indicating material out of its cavity 303 through the at least one indicator hole 311 and into the at least one indicating channel 309 when a force is applied to the load receiving area 301. An advantage of this embodiment is that each ring shaped cavity 303 can be isolated from other ring-shaped cavities 303 and therefore give separate compression readings for each cavity 303.

Figure 19:
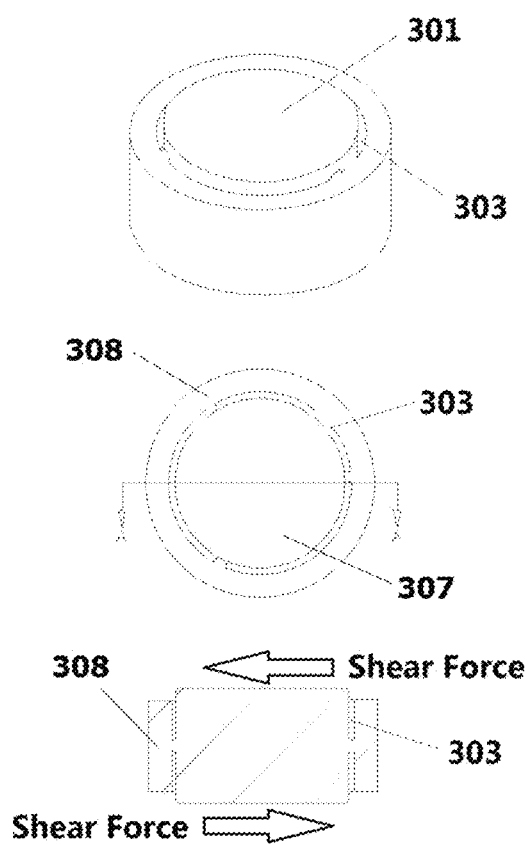
FIG. 19 is a perspective, top plan and cross sectional view of a force measuring device built in accordance with a cylindrical shaped two independent cavity embodiment of the present invention.

Referring now to FIG. 19, a cylindrical embodiment of the force measuring device having a plurality of cavities 303 adjacent to a load receiving area 301 is shown. In this embodiment, the force measuring device includes a disk 307 and an outer ring 308 to measure shear force magnitude and direction in addition to the compression and/or tension forces.

In one embodiment shown in FIG. 19, the spaces between the inner ring of disc 307 and the outer ring 308 can comprise six cavities 303 for indicating material to move in and out of. There can be three cavities 303 that are 120 degrees apart in the upper portion of the device and three corresponding cavities 303 in the lower portion of the device. The three pairs of cavities 303 in this configuration allow the magnitude and direction of the shear force to be measured by observing the difference of the amount of indicating materials moved in or out of each individual cavity 303. When the shear forces are applied as seen in the bottom image of the device, the indicating material is pressed out of the bottom right cavity 303 and indicating material moves into the upper right cavity 303. This difference in the change in volumes of the cavities can be used to measure the magnitude and direction of the shear force applied along with the magnitude and direction of compression and/or tension forces.

Figure 20:
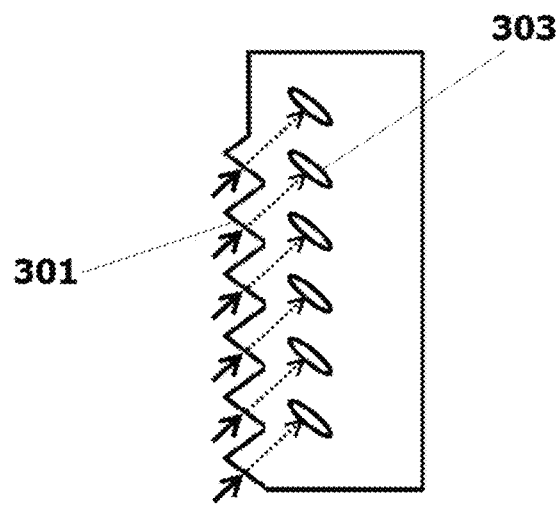
FIG. 20 is an elevational view of a force measuring device built in accordance with an embodiment of the present invention in which a cavity is located near the threads of a fastener.

Referring now to FIG. 20, an embodiment of the force measuring device with a cavity 303 is positioned near the threads of a nut, stud, bolt, or other similar structures. In this embodiment, the deformation of the at least one cavity 303 can be caused by the movement of the load receiving area 301 (i.e., the threads) when a force is applied as shown by the arrows. This embodiment can also measure the difference in the load between one thread, or one group of threads, and another thread, or group of threads, by using at least two cavities 303 that are independent.

Figure 21:
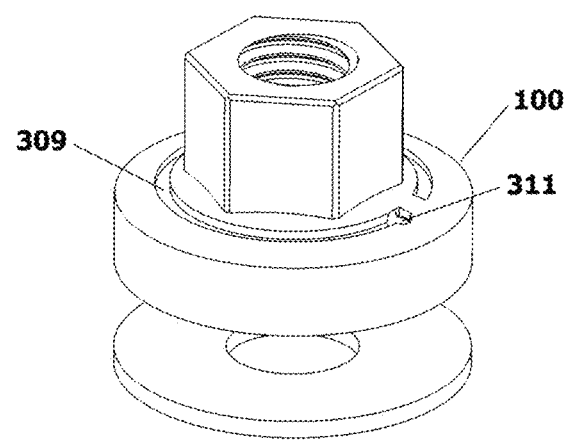
FIG. 21 is an exploded top perspective view of a force measuring device built in accordance with a flange nut embodiment of the present invention.
Figure 22:
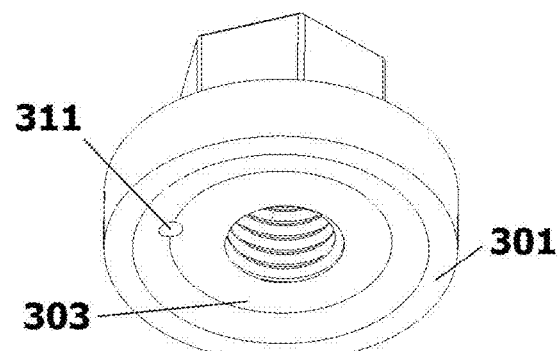
FIG. 22 is a bottom perspective view of a force measuring device built in accordance with a flange nut embodiment of the present invention.
Figure 23:
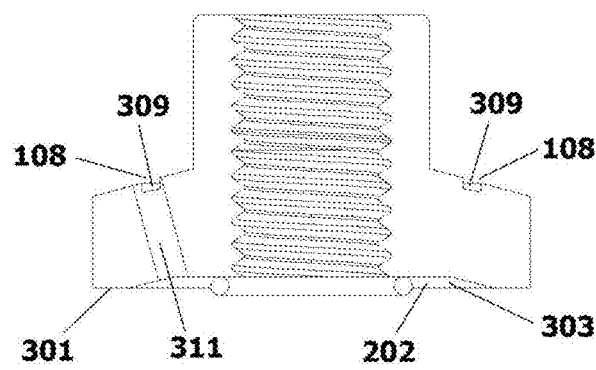
FIG. 23 is an exploded elevational view of a cross section of a force measuring device built in accordance with a flange nut embodiment of the present invention.
Figure 24:
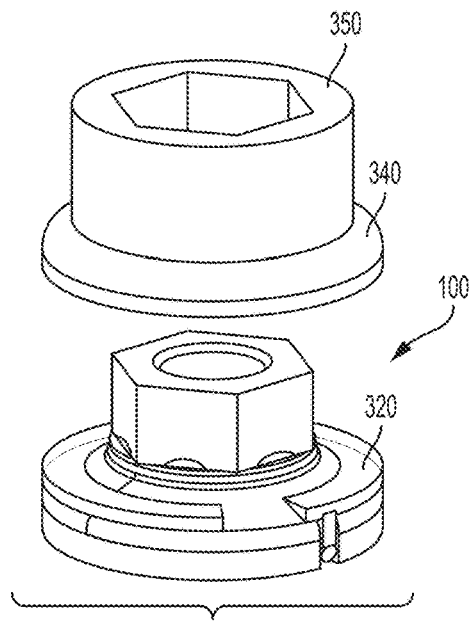
FIG. 24 is a top perspective view of a force measuring device built in accordance with a flange nut embodiment of the present invention that includes a transparent cover, shown with a removable sensing component positioned directly above the device.
Figure 25:
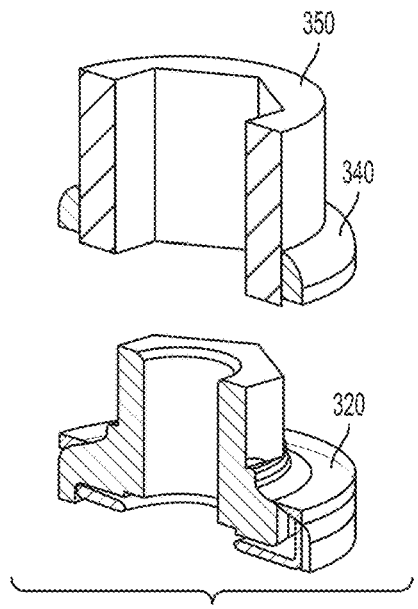
FIG. 25 is a top perspective view of a cross section of a force measuring device built in accordance with a flange nut embodiment of the present invention that includes a transparent cover, shown with a removable sensing component positioned directly above the device.
Figure 26:
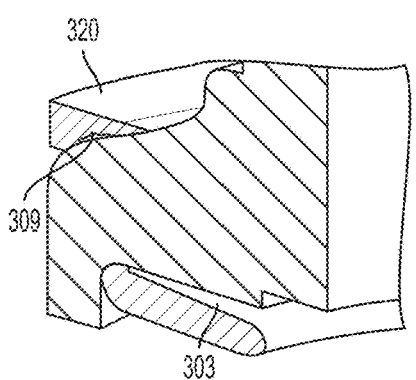
FIG. 26 is a partial top perspective view of a cross section of a force measuring device built in accordance with a flange nut embodiment of the present invention that includes a transparent cover.
Figure 27:
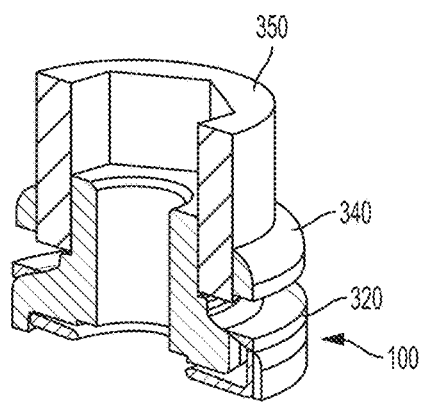
FIG. 27 is a top perspective view of a cross section of a force measuring device built in accordance with a flange nut embodiment of the present invention that includes a transparent cover, shown with a removable sensing component in an engaging position on the device.
Figure 28:
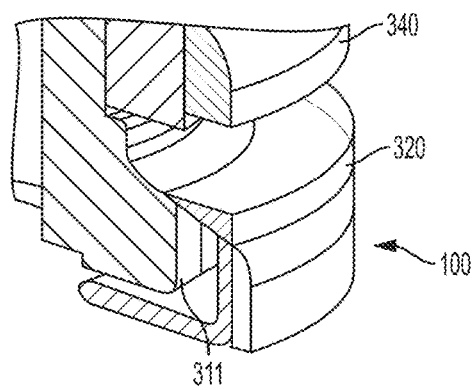
FIG. 28 is a partial top perspective view of a cross section of a force measuring device built in accordance with a flange nut embodiment of the present invention that includes a transparent cover, shown with a removable sensing component in an engaging position on the device.
Figure 29:
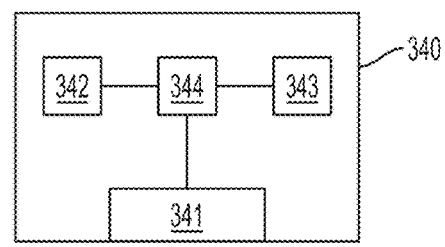
FIG. 29 is a block diagram of a sensing component for a force measuring device built in accordance with a flange nut embodiment of the present invention.
Figure 30:
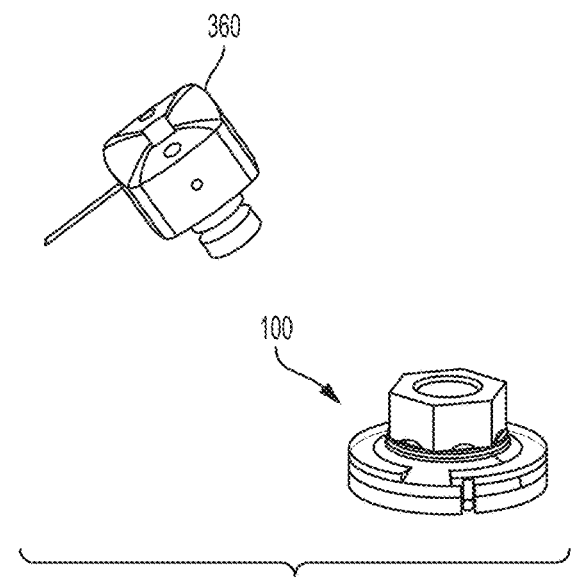
FIG. 30 is a top perspective view of a force measuring device built in accordance with a flange nut embodiment of the present invention that includes a transparent cover, shown with a sensing device embodied by a camera.

Referring now to FIG. 21, FIG. 22, and FIG. 23, a flange nut embodiment of the force measuring device 100 with a ring shaped cavity 303 is shown. In this embodiment, the design relies on tangential strain, bending, and/or compression of diagonal sections to squeeze indicating material 202 out of its cavity 303 through the at least one indicator hole 311 and into the at least one indicating channel 309 when a force is applied to the at least one load receiving area 301. The channel cover 108 (indicating the location for the cover is shown, but not the cover itself), is made of transparent or semi-transparent material, covers and seals the indicator channel 309.

Referring now to FIG. 24, FIG. 25, FIG. 26, FIG. 27, FIG. 28, FIG. 29, and FIG. 30, an implementation of a flange nut embodiment of the force measuring device 100 with a ring shaped cavity 303 and transparent channel cover 320 disposed over an indicating channel 309 having an indicating hole 311 is shown with a removable sensing component 340. It is appreciated that in many of the previously disclosed embodiments, the movement of indicating material may be simply observed by a user desiring of measuring the magnitude and/or direction of force being applied to a force measuring device built in accordance with the present invention. In some embodiments, however, the movement of indicating material from the application of a load may be measured by the sensing component 340 using optical or electrical sensors. Advantageously, once such a measurement is generated, the measurement can be displayed and/or tracked on locally or on a discrete device, or even used as an input to the device that is applying the load. In this regard, a force measuring device built in accordance with the present invention can be used to let a sensing component 340 generate an input for a tensioning device to facilitate the precise application of tension to a fastener or load cell component.

The sensing component 340 is sized and shaped to be positioned in a close proximity to the force measuring device 100 over the indicating channel 309 and includes a plurality of internal operating components. In one embodiment, the sensing component 340 is integrated with a conventional hex socket 350 that is sized and shaped to engage the flange nut embodiment of the force measuring device 100 over the indicating channel 309. The internal operating components include a sensor 341 suitable to measure the indicating material in the indicating channel 309 (typically taking optical readings through the transparent or semi transparent channel cover 320) and generate an electrical signal output which corresponds to its measurement, a power source 342, a communications interface 343, and a controller 344 that is electrically connected to the other internal operating components so as to facilitate the supply of electricity from the power source 342 to the sensor 341 and the communications interface 343 and the communication of electrical signals between the between the sensor 341 and the communications interface 343, as well as control the operation of the power source 342, the sensor 341, and the communications interface 343. Through such a construction, electrical signals corresponding to a measurement of the indicating material generated by the sensor 341 can be transmitted to external devices through the communications interface 343.

In one embodiment, the sensing component 340 may additionally include or be communicatively connected to a visual display (not shown) which can provide a visual output of measurements of the indicating material generated by the sensor 341, a speaker which can provide an audible alert as the force measuring device 100 is tensioned to predefined thresholds, and or a vibrator which can provide a tactile alert as the force measuring device 100 is tensioned to predefined thresholds. Such predetermined thresholds may include a maximum recommended tension, within 10% or better of maximum recommended tension, minimum recommended tension, etc.

It is contemplated that the sensor 341 may define an optical sensor which provides measurements based on the position of indicating material in the indicating channel. In such an embodiment, the channel cover 320 would be transparent or semi-transparent so as to allow light to pass through so that objects behind can be distinctly seen. In some embodiments, the sensor 341 may alternatively employ capacitive, inductive, resistance sensing mechanisms, particularly if an alternate channel cover that is not transparent is used.

It is contemplated that the communications interface 343 may define a wireless local area network interface, a wireless personal area network interface, both, or any wireless network of other spatial scope to allow it to communicate electrical signals with external devices. It is appreciated, however, that the communications interface 343 may also or alternatively include a wired or wireless serial communications interface or other wired networking interface to communicate electrical signals to external devices.

In use, it is appreciated that the measurements of indicating material may be transmitted by the sensing component 340 to a tensioning device, such as an impact wrench (not shown), which includes or is connected to a compatible wireless network (or a wired connection) to transfer the measured (sensed) tension or compression values to the tensioning device (and/or over a network generally). In such a scenario, the force measuring device 100 with a sensing component 320 can be connected to an impact wrench that will be tightening the device 100, potentially by actuating the hex socket 350, with the impact wrench set to use the output of the sensing component 340, particularly an output related to a particular tensioning threshold being met or exceeded, to automatically manage the tightening of the force measuring device 100 (by continuing to tighten or stopping the tightening).

In some embodiments the sensing component 340 can be integrated with a camera 360 or other remote device, such as a smart phone 370, through its image capturing functionality and a software application which corresponds the observed positioning of indicating material to measurement value. Advantageously, such a sensing component 340 integrated in the smart phone set to display, transmit, and/or record measurements as well as automatically generate alerts based on measurements.

In a circumstance wherein the sensing component 340 is connected to an impact wrench that will be tightening the device 100, it is additionally contemplated that if multiple devices are desired to be tightened by separate tensioning devices simultaneously, the measuring and transmission features of the sensing component 340 for each device 100 would also allow for simultaneous tensioning of each device 100.

It is appreciated that a sensing component may be employed with substantially any of the force measuring devices described above by measuring the movement of material into or out of an indicating channel or even a cavity itself.

Figure 32:
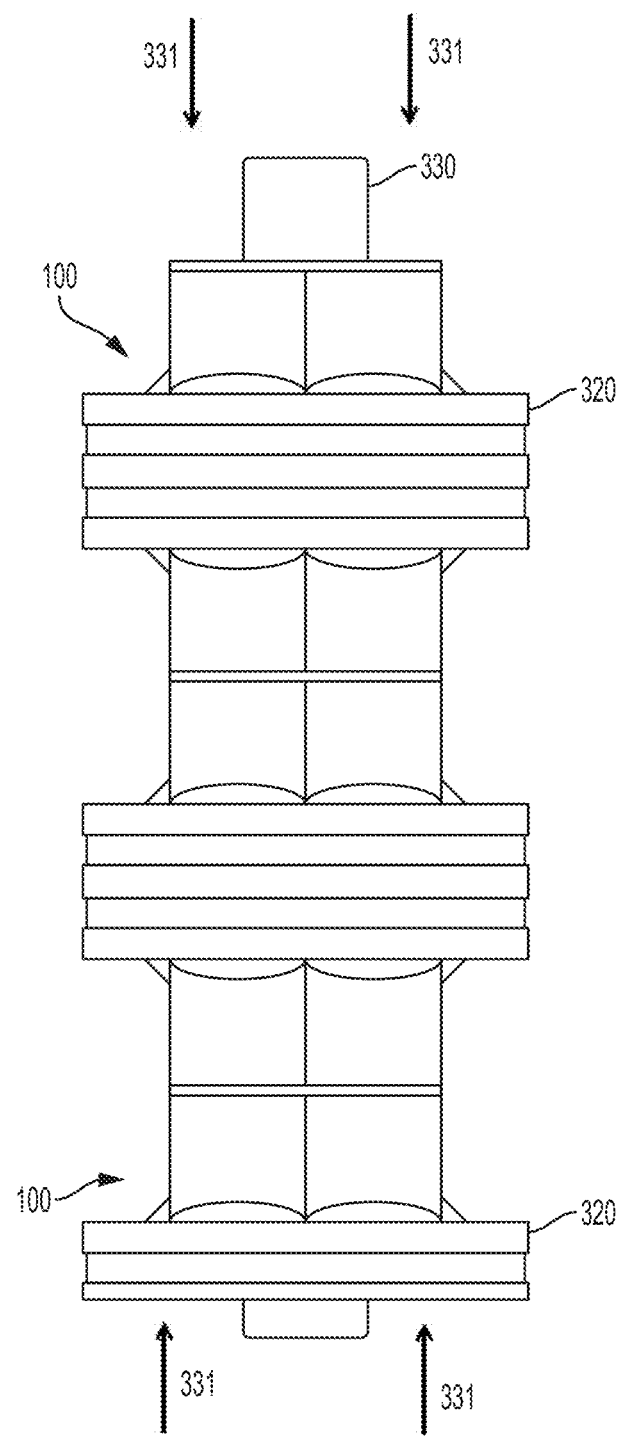
FIG. 32 is a side elevational view of a plurality of force measuring devices built in accordance with a flange nut embodiment of the present invention which are arranged on a rod in order to be calibrated.
Figure 33:
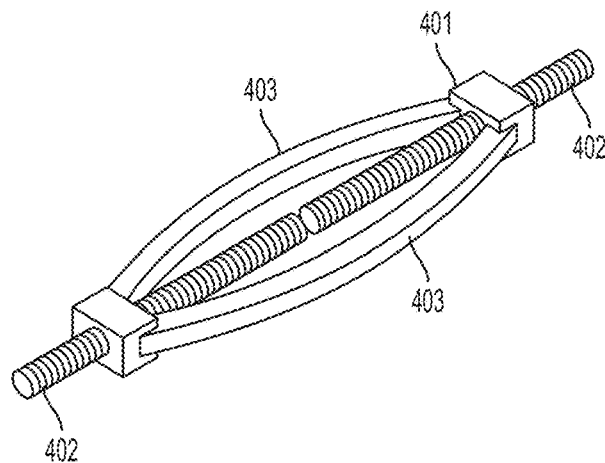
FIG. 33 is a top perspective view of a turnbuckle fastener for use with a force measuring device built in accordance with an embodiment of the present invention with the cavity holder and indicating channel components removed.
Figure 34:
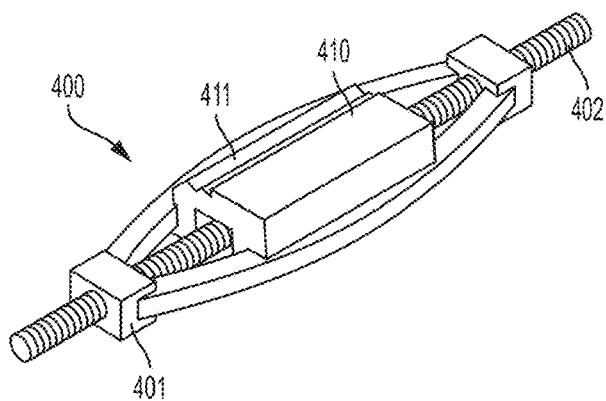
FIG. 34 is a top perspective view of a force measuring device built in accordance with a turnbuckle embodiment of the present invention with the indicating channel cover removed.
Figure 35:
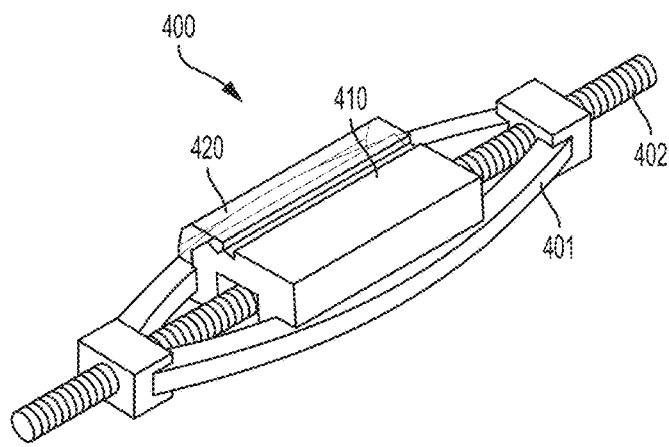
FIG. 35 is a top perspective view of a force measuring device built in accordance with a turnbuckle embodiment of the present invention that includes a transparent cover.
Figure 36:
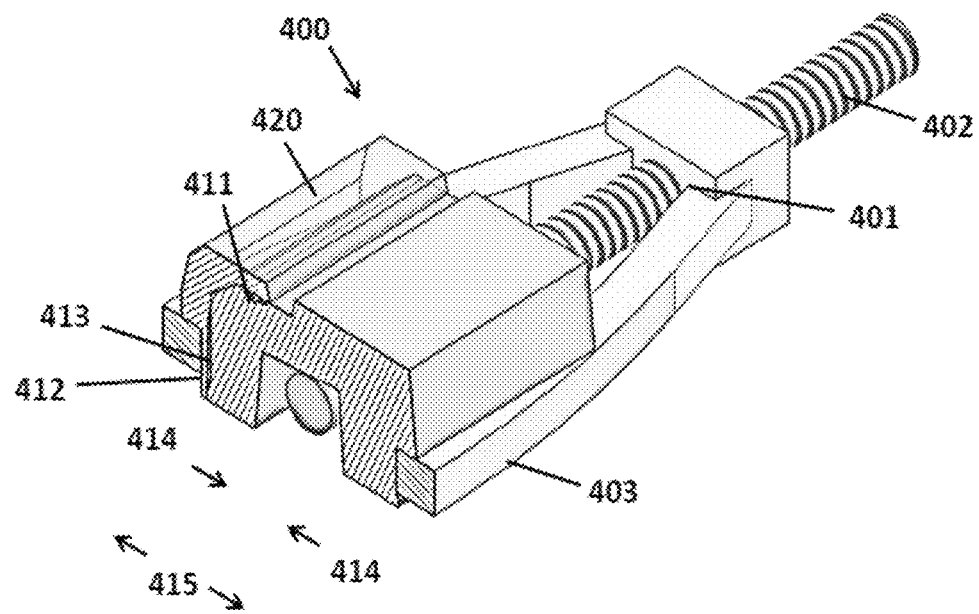
FIG. 36 is a top perspective view of a cross section of a force measuring device built in accordance with a turnbuckle embodiment of the present invention that includes a transparent cover.
Figure 37:
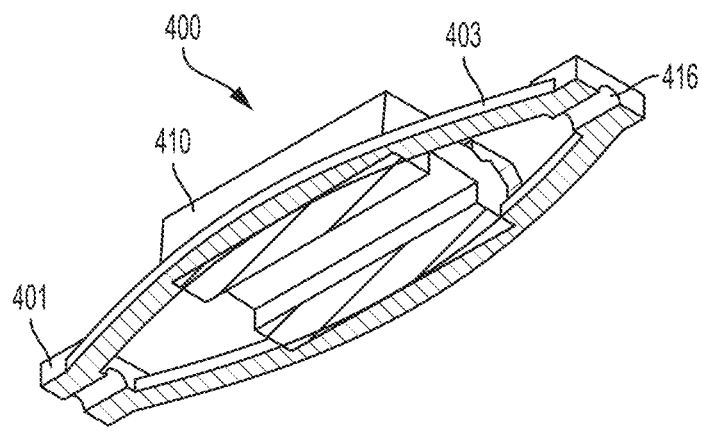
FIG. 37 is a top perspective view of a longitudinal cross section of a force measuring device built in accordance with a turnbuckle embodiment of the present invention.

Referring now to FIG. 32, a plurality of flange nut embodiment of the force measuring device 100 with a ring shaped cavity can each have their applied force sensed when stacked on a rigid, linear rod 330 using a camera or multiple cameras positioned to view the position of the indicating material in the indicating channel. It is contemplated that placing a plurality of force measuring device 100 in such a configuration would enable them all to be calibrated simultaneously. For example, if force in a compression direction is placed on the stacked force measuring devices 100, the camera(s) (or other sensing component) can be used to measure the load applied to each force measuring device 100 based on the position of the indicating material. Because of the stacked positioning, the force 331 should result in the same load being applied to each force measuring device 100. Thus, any observed differences in the indicating channel measurements can be notated to the respective force measuring device 100.

Referring now to FIG. 31, FIG. 33, FIG. 34, FIG. 35, FIG. 36, and FIG. 37, a turnbuckle type fastener embodiment of a force measuring device 400 is shown. This turnbuckle force measuring device 400 is similar to conventional rotating turnbuckle fasteners in that it includes a double nut fastener 401 (one nut on each end connected by bowed arms 403) constructed to receive two fasteners components 402 (i.e., eye-bolts, studs, screw eye, hook, bolts, and so forth) at opposing ends. The force measuring device 400 as described herein includes bowed outer arms 403 which may accommodate a measuring component 410 in between the arms 403 and deform by moving toward each other when the force measuring device 400 is tensioned. It is contemplated, however, that in some implementations the measuring component 410 and/or a sensing component (not shown) may be positioned outside the arms 403.

The measuring component 410 operates in the same manner as described above to generate movement of a fluid indicating material between a cavity 413 and an indicating channel 411 in response to an applied external load (with the cavity 413 and indicating channel 411 connected through an internal conduit). Accordingly, in one embodiment, the measuring component 410 includes a load receiving area defined by the threads 416 to receive an external load. When the turnbuckle force measuring device 400 receives a load through its threads 416, it transmits this load from one side to the other through the bowed arms 403 connecting the two threaded nuts. As the two turnbuckle load receiving areas (threads 416 on each end) receive a tightening load, this load increases the tension in a cable (not shown) to which the turnbuckle 400 is attached and causes the bowed arms 403 to straighten. The straightening of the bowed arms 403 presses on the 410 measuring component's outer cavity wall 412. The cavity 413 then changes its volume which moves indicating material from the cavity 413 and into the indicating channel 411 (typically through an indicating hole). It is noted that this process also operates in reverse, with indicating material moving into the cavity 413 from the indicating channel 411 in response to the lessening of tension on the load receiving area by way of the bowed arms 403 exerting less pressure on the outer cavity wall 412.

Figure 38:
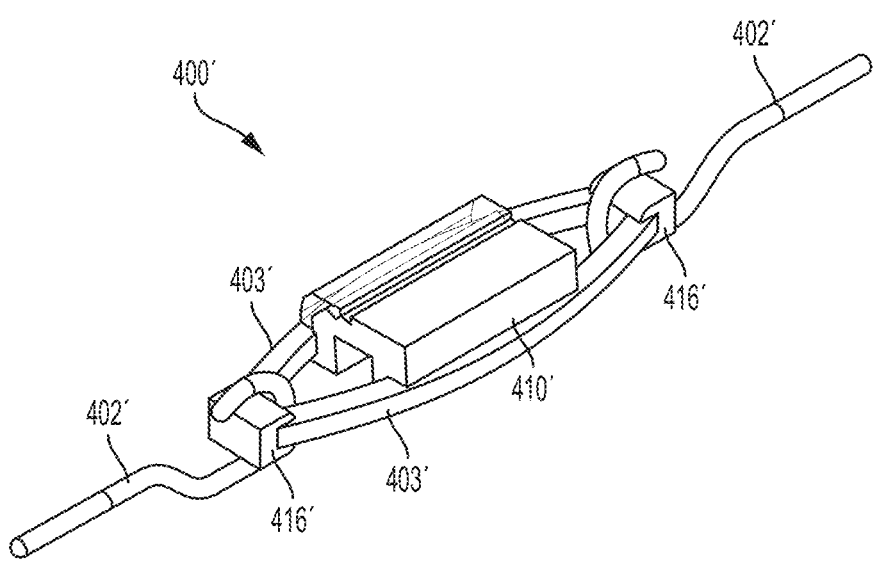
FIG. 38 is a top perspective view of a force measuring device built in accordance with an alternate turnbuckle embodiment of the present invention that uses hooks instead of internally threaded nuts.

Referring now to FIG. 38, an alternate turnbuckle type fastener embodiment of a force measuring device 400' is shown. This turnbuckle force measuring device 400' is similar to conventional rotating turnbuckle fasteners, except that the load receiving areas are not the threads but the opposing ends 416', which may be pulled by a hook type fastener component 402' at each opposing end 416'. The force measuring device 400' as described herein includes bowed outer arms 403' which allow it to deform by moving toward each other when the device 400' is tensioned and also to accommodate a measuring component 410' in between the arms 403'.

Figure 31:
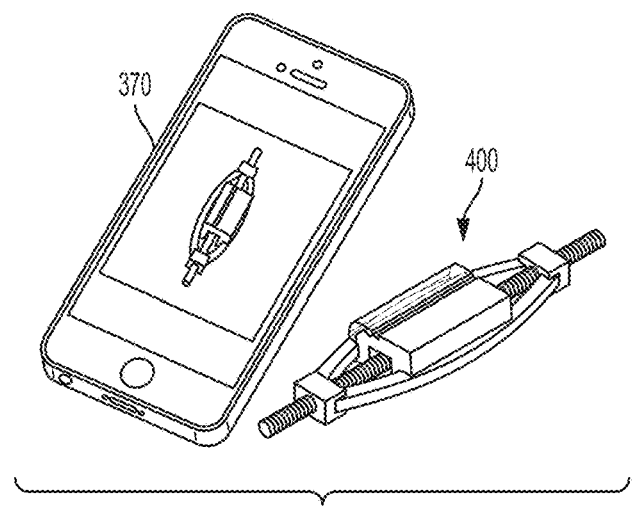
FIG. 31 is a top perspective view of a force measuring device built in accordance with a turnbuckle embodiment of the present invention that includes a transparent cover, shown with a sensing device embodied by a cellular/smart phone which has a software application for measuring the position of the indicating fluid in the indicating channel.

The sensing component, shown in FIG. 31 integrated with a smartphone 370, operates in the same manner as the sensing component described above to measure the indicating material and provide an output of its measurements of the indicating material.

In some embodiments, it is contemplated that a sensing component built in accordance with the present invention may be fixed to a measuring component built in accordance with the present invention. In other embodiments, a sensing component built in accordance with the present invention may be removably attachable to a measuring component built in accordance with the present invention. In this regard, a user desiring to tighten a double nut fastener 401 with an integrated measuring component 410 (that does not include a fixedly attached sensing component 420 can mechanically attach (magnetically or otherwise) a discrete sensing component 420 over the indicating channel 411 of the measuring component 410 prior to rotating the double nut fastener 401. Once done tightening (or loosening), the sensing component 420 may be removed (and used to tighten another fastener if desired).

It is contemplated that tightening of opposing elongated fasteners on the load cell embodiment shown in FIG. 13 and discussed above could also be monitored in much of the same manner as described in relation to the turnbuckle type fastener embodiment (with a sensing component for the cavity holder or for multiple cavity holders).

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A reversible force measuring device, comprising
at least one of a fastener component and a load cell component;
at least one load receiving area integral with the at least one of the fastener component and the load cell component;
at least one cavity disposed in the at least one of the fastener component and the load cell component and containing indicating material, wherein said at least one cavity and the at least one load receiving area are cooperatively configured such that the application of force to the at least one load receiving area causes a reversible volumetric change of the at least one cavity that causes the indicating material to move in or out of the at least one cavity to indicate the magnitude and/or direction of the applied force;
a sensing component configured to measure the movement of the indicating material;
at least one indicator channel integral with the at least one of the fastener component and the load cell component, wherein said at least one indicator channel is connected to said at least one cavity such that the indicating material which moves in or out of the at least one cavity comes from or goes to the at least one indicator channel;
at least one channel cover disposed over the at least one indicator channel, wherein the at least one channel cover is configured to allow light to pass through so that objects behind can be distinctly seen.

2. The reversible force measuring device of claim 1, wherein said sensing component is configured to measure the movement of the indicating material in the at least one indicator channel using an optical sensor.

3. A reversible force measuring device, comprising
at least one of a fastener component and a load cell component;
at least one load receiving area integral with the at least one of the fastener component and the load cell component;
at least one cavity disposed in the at least one of the fastener component and the load cell component and containing indicating material, wherein said at least one cavity and the at least one load receiving area are cooperatively configured such that the application of force to the at least one load receiving area causes a reversible volumetric change of the at least one cavity that causes the indicating material to move in or out of the at least one cavity to indicate the magnitude and/or direction of the applied force;
at least one indicator channel integral with the at least one of the fastener component and the load cell component, wherein said at least one indicator channel is connected to said at least one cavity such that the indicating material which moves in or out of the at least one cavity comes from or goes to the at least one indicator channel; and
a sensing component configured to measure the movement of the material in the at least one indicator channel.

4. The reversible force measuring device of claim 3, wherein said sensing component is configured to transmit a signal related to a measurement of the movement of the indicating material over a network.

5. The reversible force measuring device of claim 4, wherein said sensing component is configured to transmit an electrical signal related to a tensioning threshold over the network based on a measurement of the movement of the indicating material.

6. The reversible force measuring device of claim 3, wherein said sensing component is configured to generate a sensory alert related to a measurement of the movement of the indicating material.

7. The reversible force measuring device of claim 3, additionally comprising at least one channel cover disposed over the at least one indicator channel.

8. The reversible force measuring device of claim 7, wherein the at least one channel cover is configured to allow light to pass through so that objects behind can be distinctly seen.

9. The reversible force measuring device of claim 8, wherein said sensing component is configured to measure the movement of the indicating material in the at least one indicator channel through an optical sensor.

10. The reversible force measuring device of claim 3, wherein the at least one cavity is adjacent to at least one cavity wall and the application of force to the at least one load receiving area induces a Poisson effect on the at least one cavity wall which causes the reversible volumetric change of the at least one cavity.

11. The reversible force measuring device of claim 3, wherein the at least one cavity is adjacent to at least one flexible cavity wall and at least one fixed cavity wall and the application of force to the at least one load receiving area causes a reversible volumetric change of the at least one cavity through movement of the at least one flexible cavity wall.

12. A reversible force measuring device, comprising
at least one of a fastener component and a load cell component;
at least one load receiving area integral with the at least one of the fastener component and the load cell component;
at least one cavity disposed in the at least one of the fastener component and the load cell component and containing indicating material, wherein said at least one cavity and the at least one load receiving area are cooperatively configured such that the application of force to the at least one load receiving area causes a reversible volumetric change of the at least one cavity that causes the indicating material to move in or out of the at least one cavity to indicate the magnitude and/or direction of the applied force;
at least one indicator channel integral with the at least one of the fastener component and the load cell component, wherein said at least one indicator channel is connected to said at least cavity such that the indicating material which moves in or out of the at least one cavity comes from or goes to the at least one indicator channel; and
a sensing component configured to measure the movement of the material in the at least one indicator channel using an optical sensor as well as to transmit an electrical signal related to a measurement of the movement of the indicating material.

* * * * *